United States Patent
Li et al.

(10) Patent No.: US 10,462,488 B1
(45) Date of Patent: Oct. 29, 2019

(54) METHOD AND APPARATUS FOR VIDEO CODING

(71) Applicant: Tencent America LLC, Palo Alto, CA (US)

(72) Inventors: Guichun Li, Milpitas, CA (US); Xiaozhong Xu, State College, PA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/236,209

(22) Filed: Dec. 28, 2018

Related U.S. Application Data

(60) Provisional application No. 62/697,999, filed on Jul. 13, 2018.

(51) Int. Cl.
| | |
|---|---|
| H04N 19/61 | (2014.01) |
| H04N 19/139 | (2014.01) |
| H04N 19/176 | (2014.01) |
| H04N 19/44 | (2014.01) |
| H04N 19/105 | (2014.01) |

(52) U.S. Cl.
CPC ........... *H04N 19/61* (2014.11); *H04N 19/105* (2014.11); *H04N 19/139* (2014.11); *H04N 19/176* (2014.11); *H04N 19/44* (2014.11)

(58) Field of Classification Search
CPC .... H04N 19/61; H04N 19/105; H04N 19/139; H04N 19/176; H04N 19/44; H04N 19/513; H04N 19/91; H04N 19/567; H04N 19/124; H04N 19/18; H04N 19/521

See application file for complete search history.

(56) References Cited

U.S. PATENT DOCUMENTS

| | | |
|---|---|---|
| 8,526,495 B2 | 9/2013 | Liu et al. |
| 9,049,452 B2 | 6/2015 | Liu et al. |

(Continued)

OTHER PUBLICATIONS

H. Huang, J. Woods, Y. Zhao and H. Bai, "Control-Point Representation and Differential Coding Affine-Motion Compensation", IEEE Transactions on Circuits and Systems for Video Technology, vol. 23, Issue: 10, pp. 1651-1660, Oct. 2013.

(Continued)

*Primary Examiner* — Dramos Kalapodas
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. The processing circuitry decodes prediction information of a current block in a current picture from a coded video bitstream. The prediction information is indicative of an affine model in a merge mode. The processing circuitry obtains, from a buffer, motion information of bottom locations in a neighboring block that is adjacent of the current block in the current picture, and determines parameters of the affine model that is used to transform between the block and a reference block in a reference picture based on the motion information of the bottom locations in the neighboring block. Further, the processing circuitry reconstructs samples of the current block based on the affine model.

16 Claims, 18 Drawing Sheets

(56) References Cited

U.S. PATENT DOCUMENTS

| | | | |
|---|---|---|---|
| 9,510,012 B2 | 11/2016 | Liu et al. | |
| 9,769,472 B2 | 9/2017 | Liu et al. | |
| 9,813,726 B2 | 11/2017 | Liu et al. | |
| 2017/0332095 A1* | 11/2017 | Zou | H04N 19/124 |
| 2018/0091816 A1* | 3/2018 | Chien | H04N 19/13 |
| 2018/0098087 A1* | 4/2018 | Li | H04N 19/176 |
| 2018/0220149 A1* | 8/2018 | Son | H04N 19/105 |
| 2018/0270500 A1* | 9/2018 | Li | H04N 19/54 |
| 2018/0316929 A1* | 11/2018 | Li | H04N 19/105 |
| 2018/0359483 A1* | 12/2018 | Chen | H04N 19/52 |
| 2019/0028731 A1* | 1/2019 | Chuang | H04N 19/105 |
| 2019/0068989 A1* | 2/2019 | Lee | H04N 19/159 |

OTHER PUBLICATIONS

Li Li, Houqiang Li, Zhuoyi Lv, Haitao Yang, "An affine motion compensation framework for high efficiency video coding", 2015 IEEE International Symposium on Circuits and Systems (ISCAS), May 2015.

S. Lin, H. Chen, H. Zhang, S. Maxim, H. Yang, J. Zhou, "Affine transform prediction for next generation video coding", ITU-T SG16 Doc. COM16-C1016, Oct. 2015.

H. Yang, et al, "Description of Core Experiment 4 (CE4): Inter prediction and motion vector coding", ISO/IEC JTC1/SC29/WG11 JVET-J1024, 2018.

Shan Liu, JongWon Kim and C.-C. Jay Kuo, "Hybrid global/local motion compensated frame interpolation for low bit rate video coding," the Journal of Visual Communication and Image Representation, vol. 14, pp. 61-79, Jun. 2003.

Shan Liu, JongWon Kim and C.-C. Jay Kuo, "Nonlinear motion-compensated interpolation for low-bit-rate video" in Applications of Digital Image Processing XXIII, vol. 4115, p. 203-214, 2000.

Shan Liu, JongWon Kim and C.-C. Jay Kuo, "MCI-embedded motion-compensated prediction for quality enhancement of frame interpolation" in Multimedia Systems and Applications III, vol. 4209, p. 251-262, Mar. 2001.

Shan Liu, JongWon Kim and C.-C. Jay Kuo, "Video Coding via Adaptive Selection of Generalized Motion Prediction Modes" in the Picture Coding Symposium 2001, Seoul, Korea, Apr. 25-27, 2001.

X. Cao, et al, "AHG16: SDIP unified with NSQT", JCTVC-H0347, Joint Collaborative Team on Video Coding (JCTVC), of ITU-T SG 16 WP 3 and ISO/IEC JTC 1/SC 29/WG 11, San Jose, CA, Feb. 2012.

Lai, et al, "SCE3. 4 generalized combined prediction", ITU-T/ISO/IEC, JCTVC-M0221, 2013.

Lai, et al, "Non-SCE3.4: Simplified Generalized Combined Prediction", ITU-T/ISO/IEC, JCTVC-M0222, 2013.

Seregin, et al, "Uni-prediction for combined inter mode", ITU-T/ISO/IEC, JCTVC-M0445, 2013.

Xu, et al, "On unification of intra block copy and inter-picture motion compensation", ISO/IEC JTC1/SC29/WG11 JCTVC-Q0132, 2014.

Xu, et al, "Non-CE2: Intra BC merge mode with default candidates", ISO/IEC JTC1/SC29/WG11 JCTVC-S0123, 2014.

Xu, et al, "CE2: Test 3.2—Intra BC merge mode with default candidates", ISO/IEC JTC1/SC29/WG11 JCTVC-T0073, 2015.

High Efficiency Video Coding, Rec. ITU-T H.265 v4, International Telecommunication Union, Dec. 2016.

Y. Wang, et al, "CE4.2.12 Affine merge mode", JVET-K0355, 2018.

* cited by examiner

METHOD AND APPARATUS FOR VIDEO CODING

INCORPORATION BY REFERENCE

This present disclosure claims the benefit of priority to U.S. Provisional Application No. 62/697,999, "METHODS OF AFFINE MODEL PREDICTION IN VIDEO CODING" filed on Jul. 13, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that:higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. The processing circuitry decodes prediction information of a current block in a current picture from a coded video bitstream. The prediction information is indicative of an affine model in a merge mode. The processing circuitry obtains, from a buffer, motion information of bottom locations in a neighboring block that is adjacent of the current block in the current picture, and determines parameters of the affine model that is used to transform between the block and a reference block in a reference picture based on the motion information of the bottom locations in the neighboring block. Further, the processing circuitry reconstructs samples of the current block based on the affine model.

According to an aspect of the disclosure, the processing circuitry obtains, from a line buffer that buffers motion vectors of minimum-size blocks at bottom locations in a coding tree unit (CTU) row above the current block, motion vectors of specific minimum-size blocks. In an embodiment, the line buffer is configured not to buffer motion vectors of non-bottom minimum-size blocks in the CTU row above the current block. In another embodiment, the line buffer is configured not to buffer motion information of control points of affine coded blocks.

In some embodiments, the processing circuitry derives motion vectors of control points of the current block based on the motion vectors of the specific minimum-size blocks using 4-parameter affine model. In an embodiment, the processing circuitry detects, based on an affine flag, whether a minimum-size block neighboring to the control point is affine coded, the affine flag indicating whether a plurality of consecutive minimum-size blocks belong to an affine coded block. Then, the processing circuitry derives the motion vector of the control point based on the motion vector of the minimum-size block when the minimum-size block is affine coded. In an example, the processing circuitry uses the motion vector of the minimum-size block as the motion vector of the control point when the minimum-size block neighboring to the control point is affine coded.

In some embodiments, the processing circuitry determines a pair of minimum-size blocks that are affine coded, and determines parameters of a four-parameter affine model based on motion vectors of the pair of minimum-size blocks. In an example, the processing circuitry determines a pair of consecutive minimum-size blocks that are affine coded, and determines the parameters of the four-parameter affine model based on motion vectors of the pair of consecutive minimum-size blocks.

In an embodiment, the processing circuitry determines a pair of minimum-size blocks that are affine coded, and determines motion vectors of control points at two top corners of the current block based on motion vectors of the pair of minimum-size blocks.

In another embodiment, the processing circuitry disables an affine merge mode when none of left neighboring blocks of the current block is available as an affine coded block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
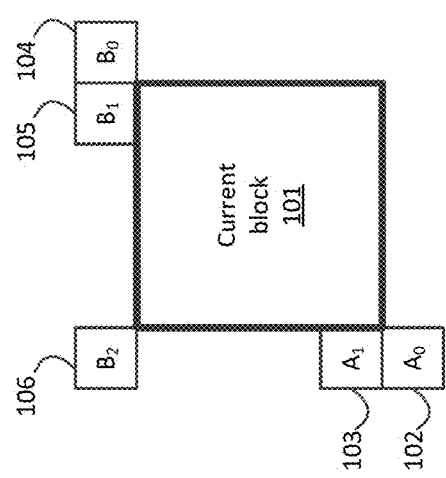
FIG. 1 is a schematic illustration of a current block and its surrounding spatial merge candidates in one example.
Figure 2:
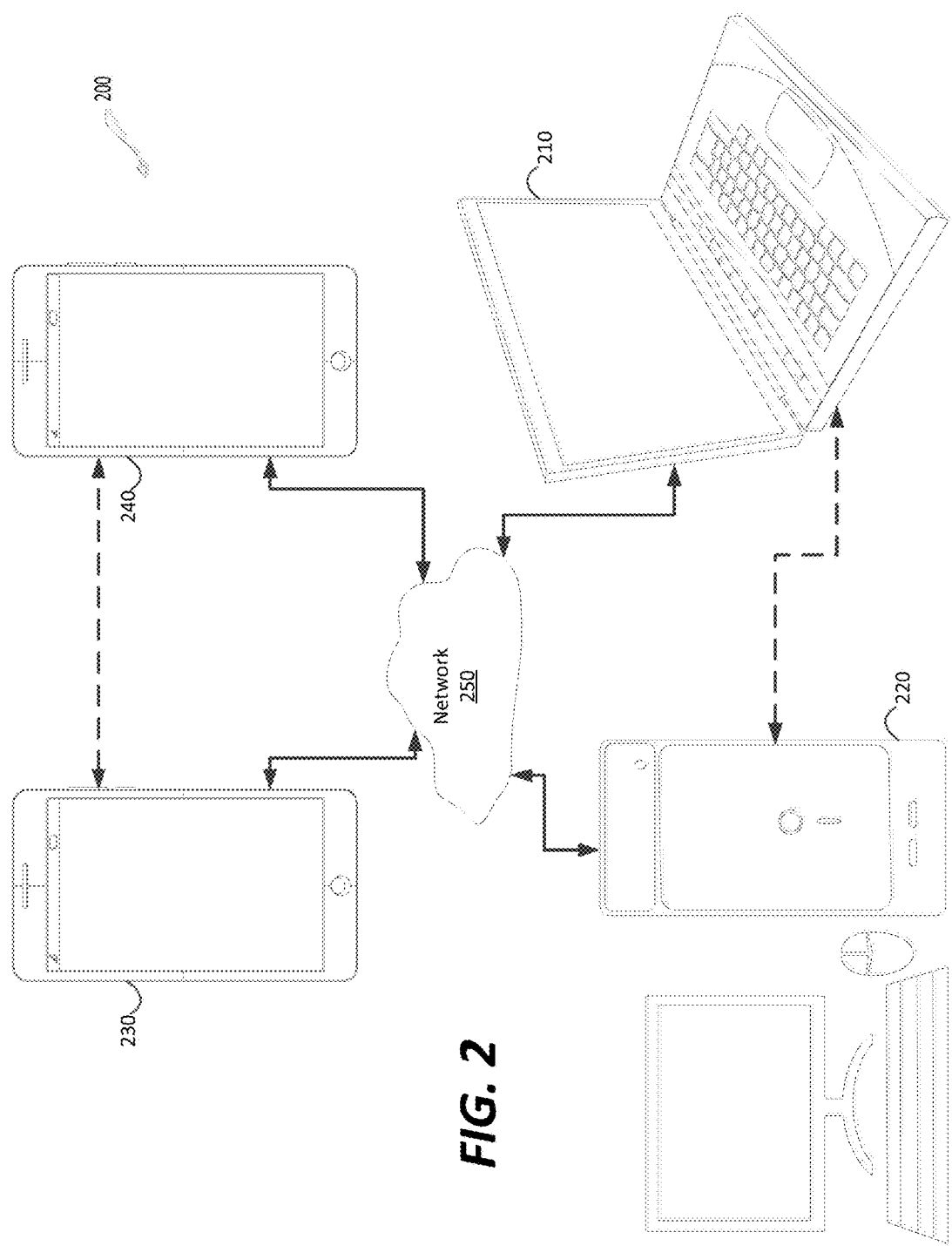
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
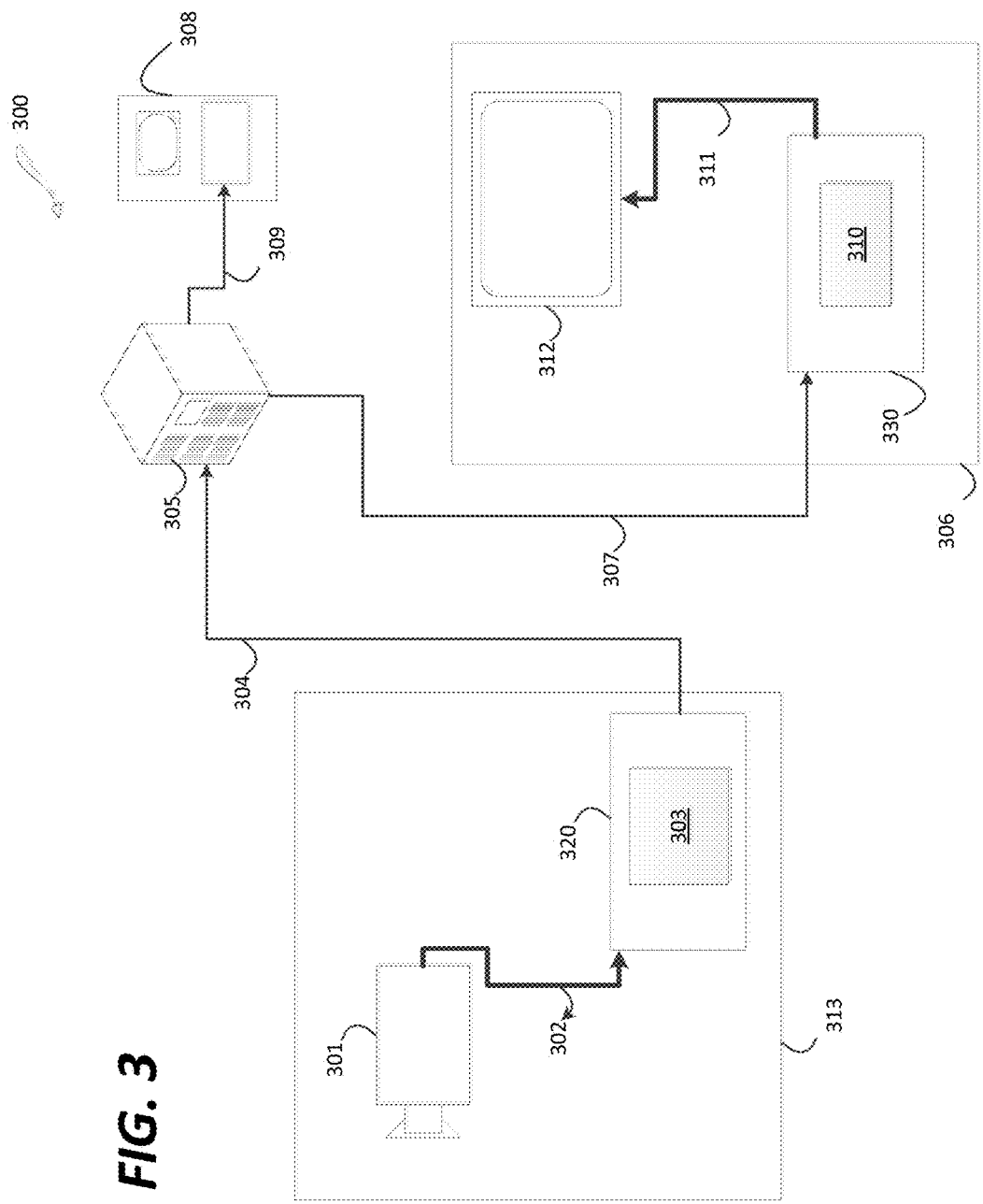
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
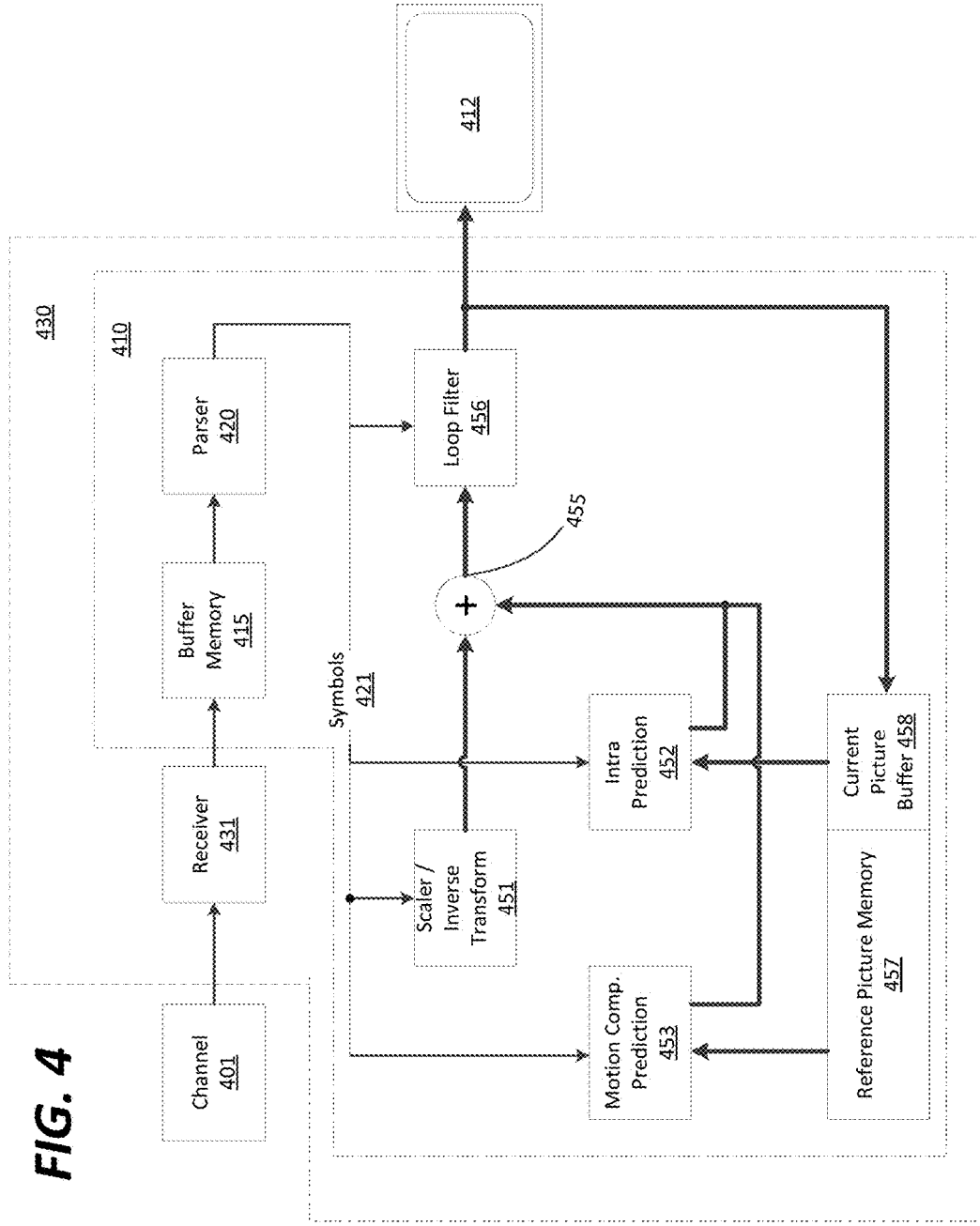
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
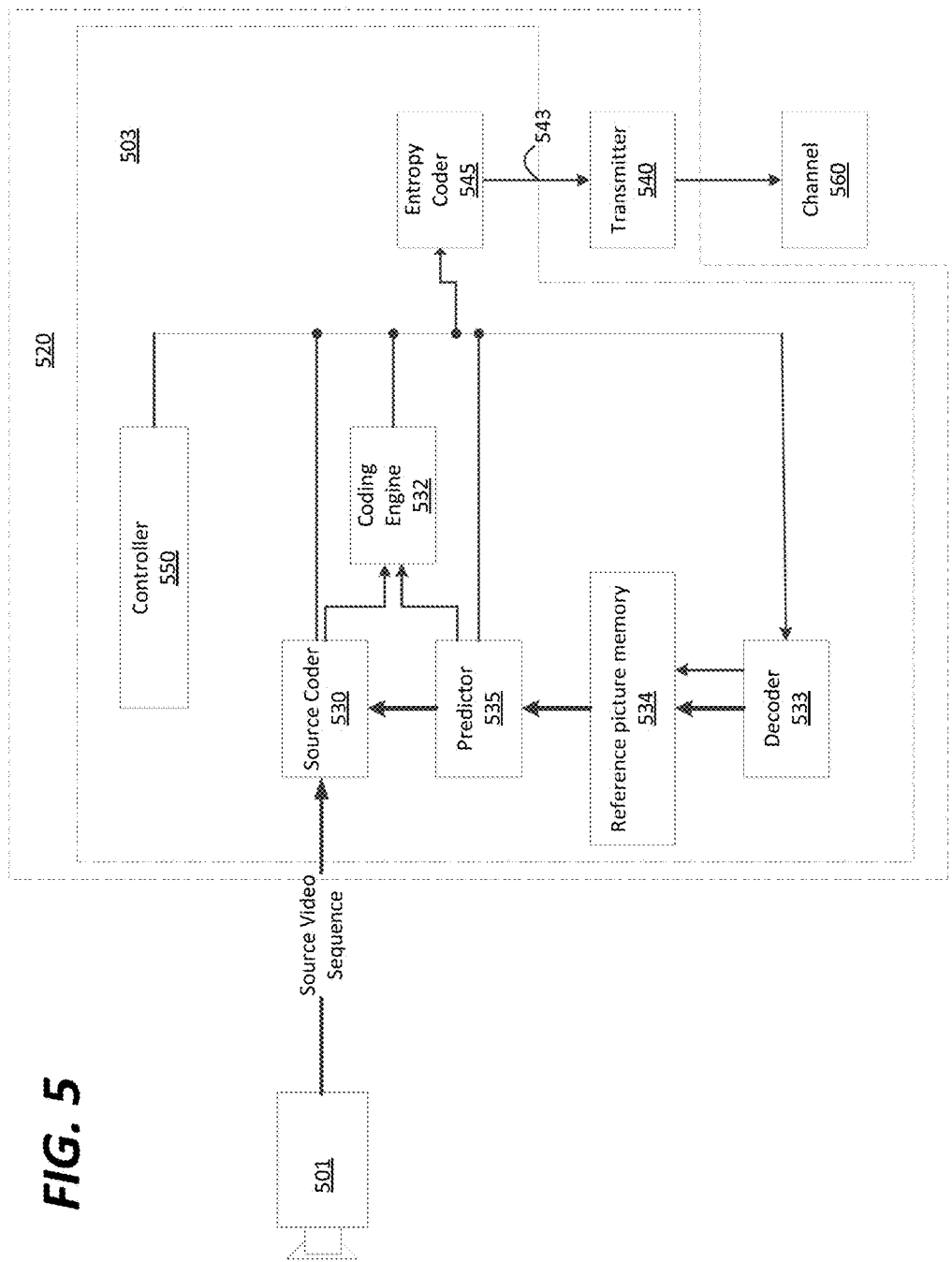
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
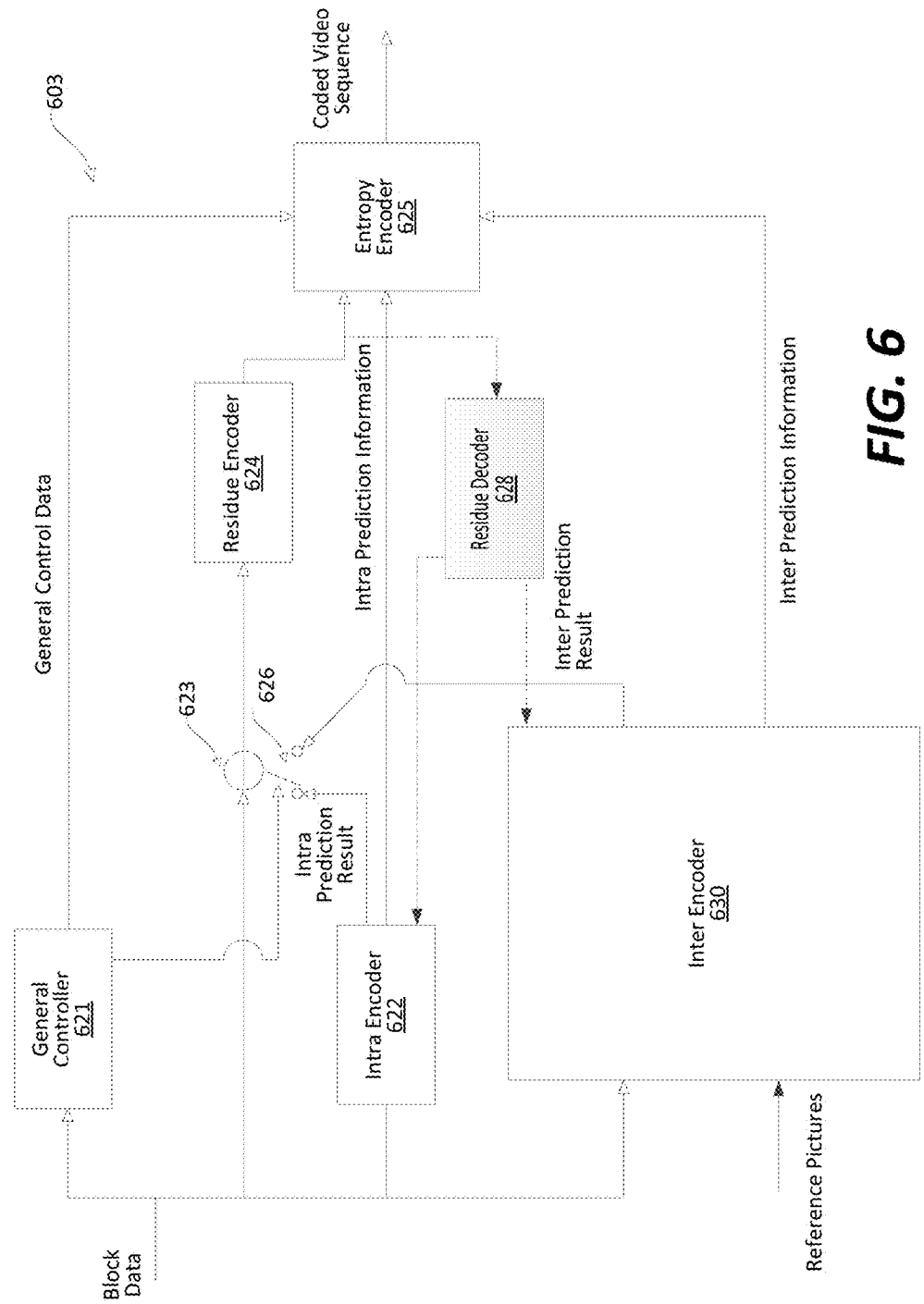
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
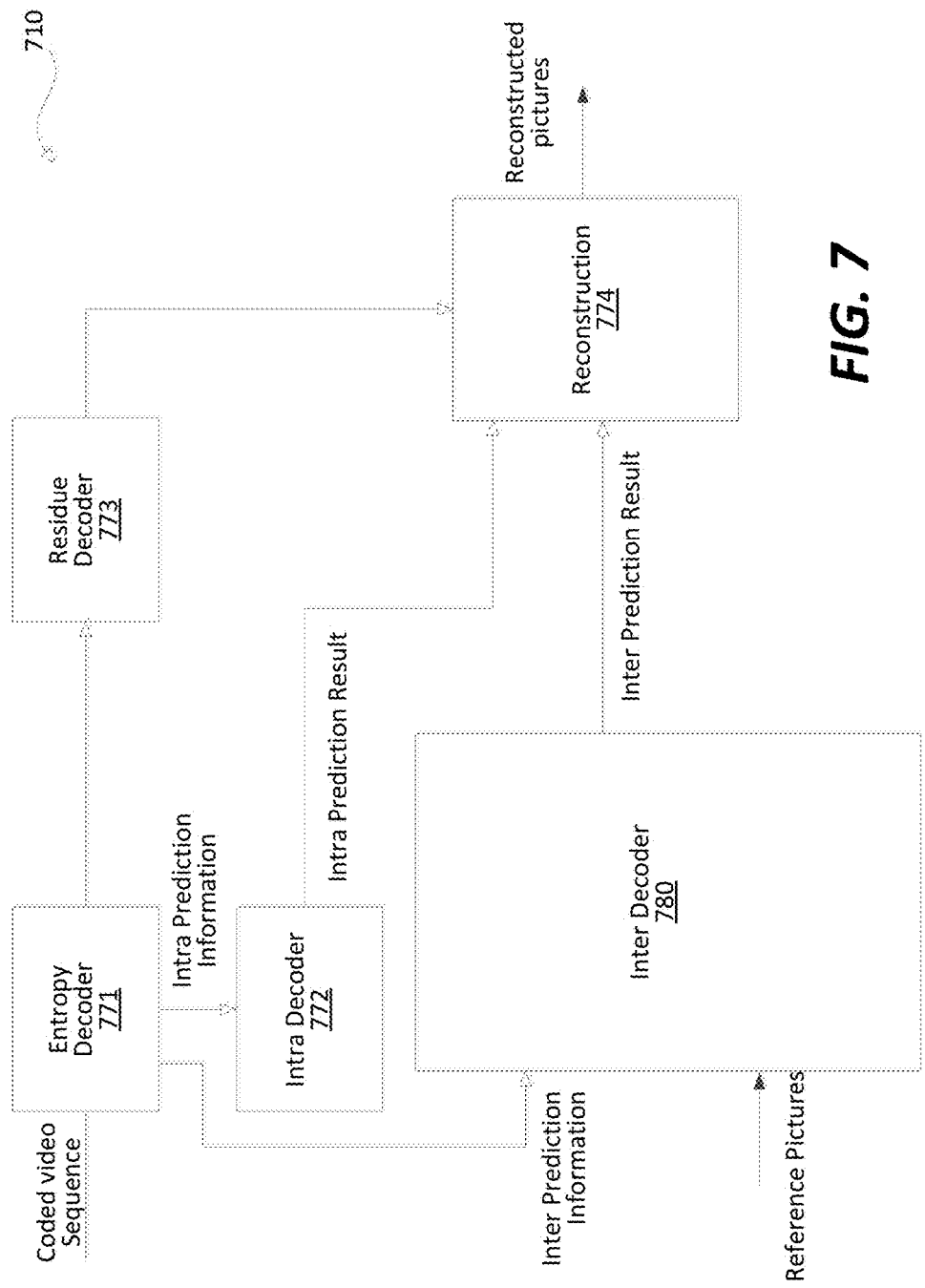
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be)

to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for affine model prediction in video coding (encoding/decoding).

Generally, a motion vector for a block can be coded either in an explicit way, to signal the difference to a motion vector predictor (e.g., advanced motion vector prediction or AMVP mode); or in an implicit way, to be indicated completely from one previously coded or generated motion vector. The later one is referred to as merge mode, meaning the current block is merged into a previously coded block by using its motion information.

Both the AMVP mode and the merge mode construct candidate list during decoding.

Figure 8:
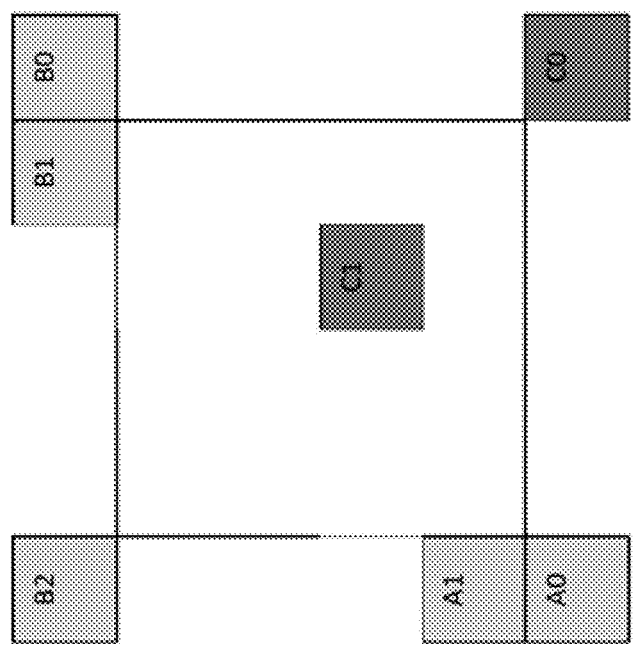
FIG. 8 shows an example of spatial and temporal candidates in some examples.

FIG. 8 shows an example of spatial and temporal candidates in some examples.

For the merge mode in the inter prediction, merge candidates in a candidate list are primarily formed by checking motion information from either spatial or temporal neighboring blocks of the current block. In the FIG. 8 example, candidate blocks A1, B1, B0, A0 and B2 are sequentially checked. When any of the candidate blocks are valid candidates, for example, are coded with motion vectors, then, the motion information of the valid candidate blocks can be added into the merge candidate list. Some pruning operation is performed to make sure duplicated candidates will not be put into the list again. The candidate blocks A1, B1, B0, A0 and B2 are adjacent to corners of the current block, and are referred to as corner candidates.

After spatial candidates, temporal candidates are also checked into the list. In some examples, the current block's co-located block in a specified reference picture is found. The motion information at C0 position (bottom right corner of the current block) of the co-located block will be used as temporal merge candidate. If the block at this position is not coded in inter mode or not available, C1 position (at the outer bottom right corner of the center of the co-located block) will be used instead. The present disclosure provides techniques to further improve merge mode.

According to an aspect of the disclosure, affine motion compensation, for example by describing a 6-parameter (or a simplified 4-parameter) affine model for a coding block, can efficiently predict the motion information for samples within the current block. More specifically, in an affine coded or described coding block, different part of the samples can have different motion vectors. The basic unit to have a motion vector in an affine coded or described block is referred to as a sub-block. The size of a sub-block can be as small as 1 sample only; and can be as large as the size of current block.

When an affine mode is determined, for each sample in the current block, its motion vector (relative to the targeted reference picture) can be derived using such a model (e.g., 6 parameter affine model or 4 parameter affine model). In order to reduce implementation complexity, affine motion compensation is performed on a sub-block basis, instead of on a sample basis. That means, each sub-block will derive its motion vector and for samples in each sub-block, the motion vector is the same. A specific location of each sub-block is assumed, such as the top-left or the center point of the sub-block, to be the representative location. In one example, such a sub-block size contains 4×4 samples.

In general, an affine model has 6 parameters to describe the motion information of a block. After the affine transformation, a rectangular block will become a parallelogram. In an example, the 6 parameters of an affine coded block can be represented by 3 motion vectors at three different locations of the block.

Figure 9:
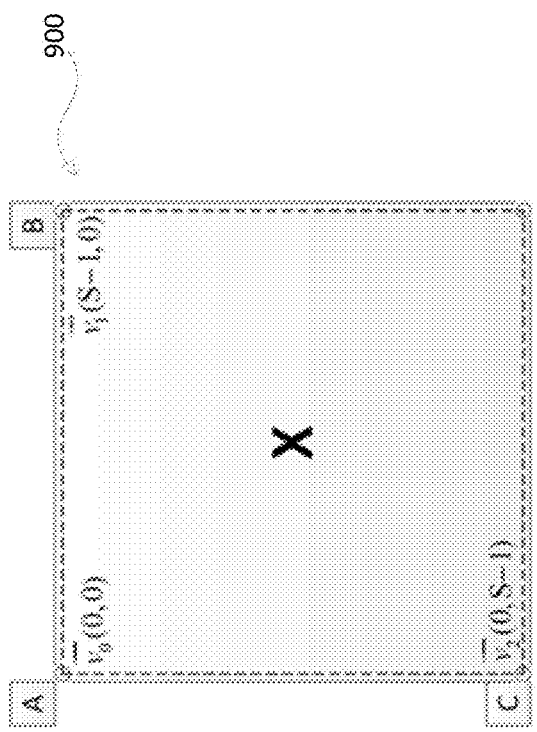
FIG. 9 shows an example of a block (900) with an affine model.

FIG. 9 shows an example of a block (900) with an affine model. The block (900) uses motion vectors $\overline{v}_0$, $\overline{v}_1$, and $\overline{v}_2$ at three corner locations A, B and C to describe the motion information of the affine model used for the block (900). These locations A, B and C are referred to as control points.

In a simplified example, an affine model uses 4 parameters to describe the motion information of a block based on an assumption that after the affine transformation, the shape of the block does not change. Therefore, a rectangular block will remain a rectangular and same aspect ratio (e.g., height/width) after the transformation. The affine model of such a block can be represented by two motion vectors at two different locations, such as at corner locations A and B.

Figure 10:
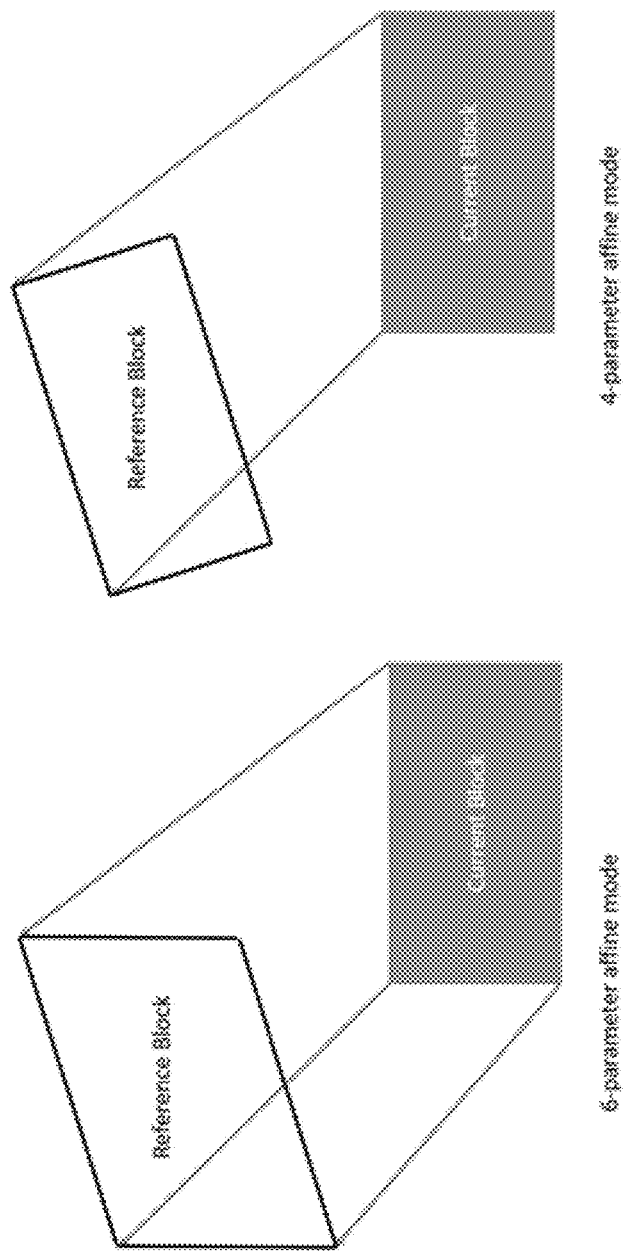
FIG. 10 shows examples of affine transformation in some examples.

FIG. 10 shows examples of affine transformation for a 6-parameter affine mode (using 6-parameter affine model) and a 4-parameter affine mode (using 4-parameter affine model).

According to an aspect of the disclosure, when affine motion compensation is used, two signaling techniques can be used. The first signaling technique is used in the merge mode, and the second signaling technique is used in residue mode or advanced motion vector prediction (AMVP) mode.

In the merge mode, the affine information of current block is predicted from previously affine coded blocks. Various techniques can be used to predict the affine information. In a first embodiment, the reference block and the current block are assumed of a same affine object, so that the motion vectors (MVs) at the control points of the current block can be derived from the reference block's model (e.g., corresponding points of the reference block). Further, the MVs at other locations of the current block are linearly modified in the same way as from one control point to another in the reference block. The technique used in the first embodiment is referred to as a model based affine prediction.

In a second embodiment, motion vectors of neighboring blocks are used directly as the motion vectors at current block's control points. Then motion vectors at the rest of the block are generated using the information from the control points. The technique used in the second embodiment is referred to as control point based affine prediction.

In the merge mode, in either of the first embodiment and the second embodiment, no residue components of the MVs at current block are signaled. The residue components of the MVs are assumed to be zero.

In the residue mode (or AMVP mode), affine parameters, or the MVs at the control points of the current block, can be predicted. In an embodiment, because there are more than one motion vectors to be predicted, the candidate list for motion vectors at all control points is organized in a grouped way such that each candidate in the candidate list includes a set of motion vector predictors for all control points. For example, candidate 1={predictor 1A for control point A, predictor 1B for control point B, predictor 1C for control point C}; candidate 2={predictor 2A for control point A, predictor 2B for control point B, predictor 2C for control point C}, etc. The predictors for the same control point in different candidates (e.g., the predictor 1A and the predictor 2A) can be the same or different. The motion vector predictor flag ((mvp_10_flag for List 0 or mvp_11 flag for List 1) will be used to indicate which candidate from the list is chosen. After prediction, the residue part of the parameters (e.g., a difference of a parameter to a predicted parameter by the predictor), or the differences of the MVs at the control points (e.g., a difference of a MV to a predicted MV by a MV predictor), are to be signaled. The MV predictor at each control point can also come from model based affine prediction from one of its neighbors, using the techniques described from the above description for (affine) merge mode.

In some embodiments, for a block coded in affine mode, once the parameters of the affine model are determined, for example the MVs at control points are decided, the MVs for the rest locations of the block can be calculated using the affine model.

For example, a pixel correspondence between a location (x, y) in current block and a corresponding location (x', y') in the reference picture is shown in (Eq. 1) using a 4-parameter affine model. In (Eq. 1), $\rho$ is the scaling factor for zooming, $\theta$ is the angular factor for rotation, and (c, f) is the motion vector to describe the translational motion. The four parameters are $\rho$, $\theta$, c and f.

$$\begin{cases} x' = \rho\cos\theta \cdot x + \rho\sin\theta \cdot y + c \\ y' = -\rho\sin\theta \cdot x + \rho\cos\theta \cdot y + f \end{cases} \quad \text{(Eq. 1)}$$

In an embodiment, for an arbitrary position (x, y) in the current block, its motion vectors pointing to the reference picture can be determined by getting the corresponding location (x', y') of the corresponding pixel in the said reference picture, using (Eq. 1). In the embodiment, the motion vector MV0 for the position (x, y) will be MV0=(x'−x, y'−y). In an example, the affine compensation is performed by dividing the whole block (current block) into an array of smallest units. Pixels within a unit (e.g., smallest unit) share the same motion vector. The location of each unit (e.g., smallest unit) is determined by using a selected location (representing location) in the unit, such as the top-left pixel, the center of the unit, etc. The size of the smallest unit for affine compensation can be 1 pixel, 4×4 pixels, M×N pixels, M and N are positive integers, etc.

In some examples, the current block is divided into sub-blocks. In a sub-block, a location is selected, and a motion vector for the selected location is referred to as a motion vector field (MVF) of the sub-block. In an example, a sub-block is a smallest unit for affine compensation. The MVF of the sub-block can be determined based on motion vectors at control points of the current block.

Figure 11:
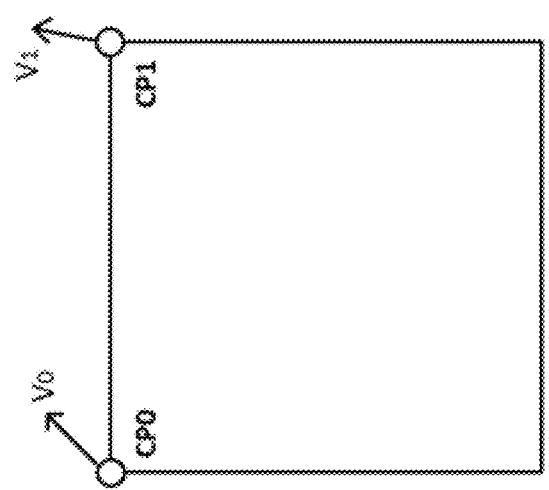
FIG. 11 shows a diagram of a current block and two control points CP0 and CP1 of the current block according to some embodiment of the disclosure.

FIG. 11 shows a diagram of a current block and two control points CP0 and CP1 of the current block according to some embodiment of the disclosure. In the FIG. 11 example, CP0 is the control point located at the top-left corner of the current block, and has a motion vector V0=$(v_{0x}, v_{0y})$, and CP1 is the control point located at the top-right corner of the current block, and has a motion vector V1=$(v_{1x}, v_{1y})$.

In the FIG. 11 example, when the selected location for a sub-block is (x,y) ((x,y) is the relative location to the top left corner of the current block), then the MVF of the sub-block is V=$(v_x, v_y)$, and can be calculated using (Eq. 2):

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x - \frac{(v_{1x} - v_{0x})}{w}y + v_{0y} \end{cases} \quad \text{(Eq. 2)}$$

where w denotes the width and height of the current block (e.g., the current block has a square shape).

It is noted that other suitable locations can be chosen as control points, and the derivation of motion vectors at any arbitrary positions inside the current block can be similarly represented as in (Eq. 2). In an example, the bottom two corners are used as control points CP2 and CP3. CP2 is the control point located at the bottom-left corner of the current block, and has a motion vector V2=$(v_{2x}, v_{2y})$, and CP3 is the control point located at the bottom-right corner of the current block, and has a motion vector V3=$(v_{3x}, v_{3y})$. Then, the motion vector V=$(v_x, v_y)$ at a location (x,y) ((x,y) is the relative location to the top left corner of the current block can be calculated using (Eq. 3):

$$\begin{cases} v_x = \frac{(v_{3x} - v_{2x})}{w}x - \frac{(v_{3y} - v_{2y})}{w}(y-w) + v_{2x} \\ v_y = \frac{(v_{3y} - v_{2y})}{w}x - \frac{(v_{3x} - v_{2x})}{w}(y-w) + v_{2y} \end{cases} \quad \text{(Eq. 3)}$$

According to an aspect of the disclosure, various techniques can be used to generate affine predictors for the current block, using either model based affine prediction from multiple neighboring affine coded blocks, or using multiple control point based affine merge from multiple neighboring MVs.

Figure 12:
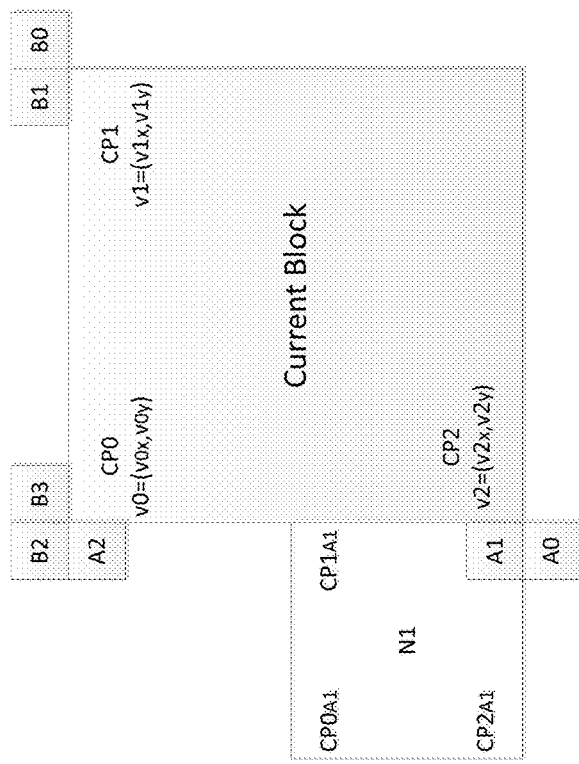
FIG. 12 shows a diagram of motion vector prediction in an affine mode according to an embodiment of the disclosure.

FIG. 12 shows a diagram of motion vector prediction in an affine mode according to an embodiment of the disclosure. FIG. 12 shows three corners that can be selected as control points CP0, CP1 and CP2. CP0 is the control point located at the top-left corner of the current block, and has a motion vector $v_0 = (v_{0x}, v_{0y})$, CP1 is the control point located at the top-right corner of the current block, and has a motion vector $v_1 = (v_{1x}, v_{1y})$, and CP2 is the control point located at the bottom-left corner of the current block, and has a motion vector $v_2 = (v_2x, v_{2y})$.

In an embodiment, in affine AMVP mode, a pair of control points {CP0, CP1} is used and a candidate list with motion vector pair of {CP0, CP1} is constructed using the neighboring blocks. For example, the candidate list is represented by $\{(v_0, v_1)|v_0 = \{v_{B2}, v_{B3}, v_{A2}\}, v_1 = \{v_{B1}, v_{B0}\}\}$. As shown in FIG. 12, $v_0$ is selected from the motion vectors of the block B2, B3 or A2. The motion vector from the neighboring block is scaled according to the reference list and the relationship among the POC of the reference for the neighboring block, the POC of the reference for the current CU and the POC of the current CU. Similarly, $v_1$ is selected from motion vectors of the neighboring block B1 and B0. In an example, if the number of candidates in the candidate list is smaller than 2, the candidate list is padded by the motion vector pair composed by duplicating each of the AMVP candidates. For example, in $v_1 = \{v_{B1}, v_{B0}\}$, if $v_{B0}$ is not available, each CP1 in {CP0, CP1} pair will use $v_{B1}$. In another example, when the number of candidates in the candidate list is larger than 2, the candidates are firstly sorted according to the consistency of the neighboring motion vectors (e.g., similarity of the two motion vectors in a pair candidate) and only the first two candidates are kept. In some examples, at the encoder side, a rate distortion (RD) cost check is used to determine which motion vector pair candidate is selected as the motion vector predictors (MVPs) of the control points for the current block. Further, an index indicating the position of a selected MVP of a control point in the candidate list is signaled in the coded video bitstream. After the MVP of the control point for the current affine block is determined, affine motion estimation is applied and the motion vector of the control point is found. Then the difference of the MV of the control point and the MVP of the control point is signaled in the coded video bitstream.

It is noted that, at the decoder side, the candidate list is constructed in the similar manner as at the encoder side. Further, the decoder decodes the index that indicates the position of the selected MVP of the control point in the candidate list from the coded video bitstream and decodes the difference between the MVP and the MV of the control point. Based on the MVP of the control point and the difference, the decoder determines the MV of the control point.

In another embodiment, a technique referred to as a model based affine merge is used. For example, when a block is applied in affine merge mode, candidate blocks from the valid neighboring reconstructed blocks are checked to find a block coded with affine mode. For example, the first block coded with affine mode is selected as the merge candidate.

The selection of the first block is according to a selection order. In an example, the selection order for the candidate blocks is from left, above, above right, left bottom to above left, such as in the order of {A1, B1, B0, A0, B2} in the FIG. 12 example. It is noted that other suitable selection order can be used. For example, the neighboring left block A1 as shown in FIG. 12 is coded in affine mode. The neighboring left block A1 is in a coding unit N1. Then the motion vectors of control points, such as $CP0_{A1}$, $CP1_{A1}$, $CP2_{A1}$ at the top left corner, above right corner and left bottom corner of the coding unit N1 are derived. Then, in an example, the motion vector of the top left control point (CP0) on the current CU (or current block) is calculated according to motion vectors of $CP0_{A1}$, $CP1_{A1}$, and $CP2_{A1}$. Further, the motion vector of the above right control point (CP1) of the current CU (or current block) is calculated according to the motion vectors of $CP0_{A1}$, $CP1_{A1}$, and $CP2_{A1}$.

After the MVs of the current CU's control points CP0 and CP1 are derived, according to the simplified affine motion model in an example, the MVF of the current CU can be calculated for example according to (Eq. 2). In an embodiment, when at least one neighboring block of the current CU is coded in affine mode, the encoder signals an affine flag in the coded video bitstream in order to identify whether the current CU is coded with affine merge mode. At the decoder side, the decoder can decodes the affine flag from the coded video bitstream, and determines whether the current block is coded in affine merge mode based on the affine flag.

Figure 13:
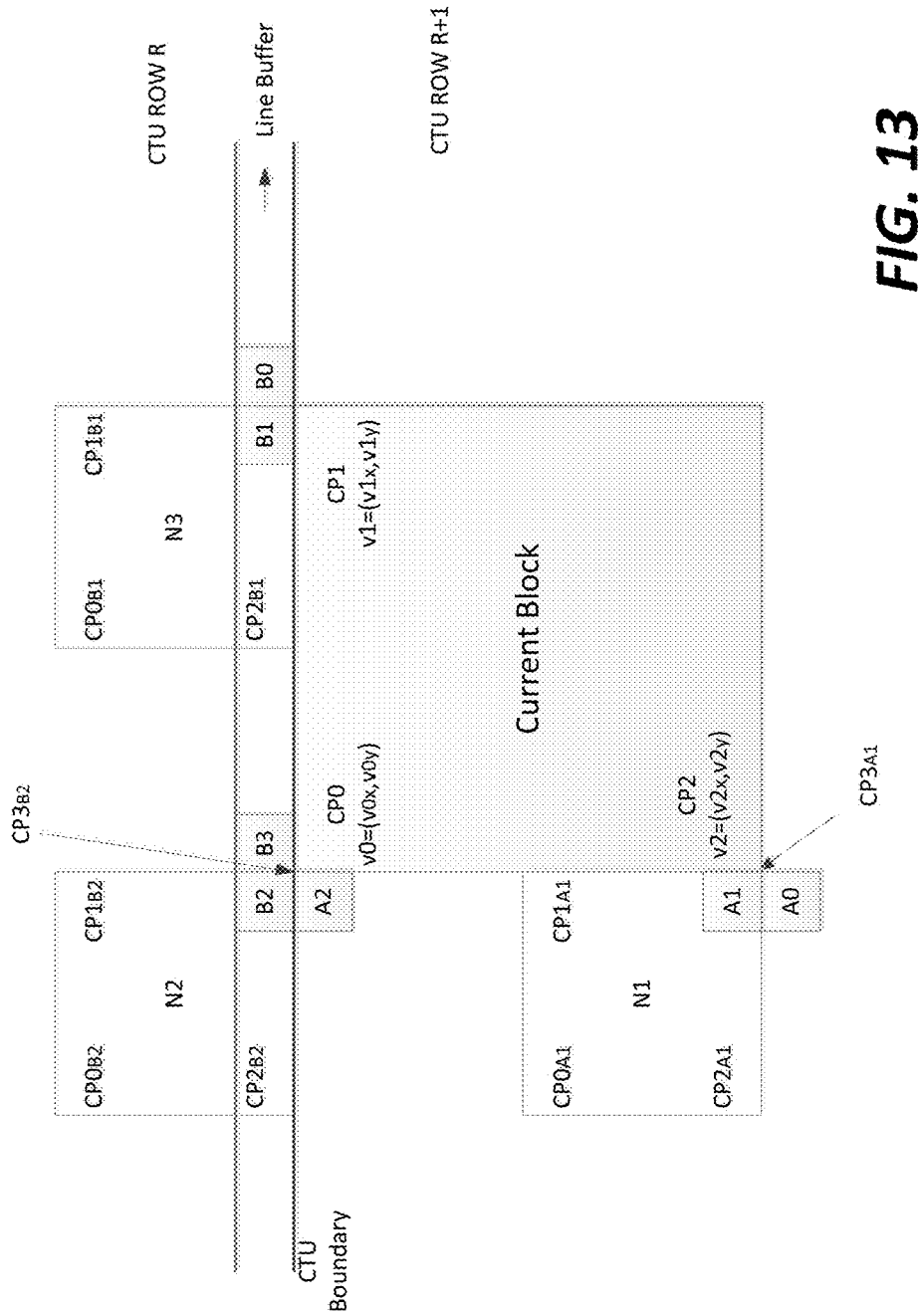
FIG. 13 shows another diagram of motion vector prediction in an affine mode according to an embodiment of the disclosure.

FIG. 13 shows another diagram of motion vector prediction in an affine mode according to an embodiment of the disclosure. In the FIG. 13 example, the current block is at a CTU top boundary. Thus, some of the neighboring blocks, such as above neighboring blocks N2 and N3 and the like, are in a different CTU. In an example, the neighboring block B2 as shown in FIG. 13 is coded in affine mode and is selected. The neighboring block B2 is in a coding unit N2. Then the motion vectors of control points, such as $CP0_{B2}$, $CP1_{B2}$, $CP2_{B2}$ at the top left corner, above right corner and left bottom corner of the coding unit N2 are derived. Then, in an example, the motion vector of the top left control point (CP0) on the current CU (or current block) is calculated according to motion vectors of $CP0_{B2}$, $CP1_{B2}$, and $CP2_{B2}$. Further, the motion vector of the above right control point (CP1) of the current CU (or current block) is calculated according to the motion vectors of $CP0_{B2}$, $CP1_{B2}$, and $CP2_{B2}$.

In some examples, when the current block is at the CTU top boundary as shown in FIG. 13, neighboring block's motion information are saved in a line buffer. In an example, the line buffer saves information of all MVs of control points for the neighboring blocks and the corresponding block sizes, thus the line buffer needs to have a relatively large size.

In another embodiment, multiple control points based affine merge can be used. The multiple control points based affine merge is referred to as a complex merge mode.

Figure 14B:
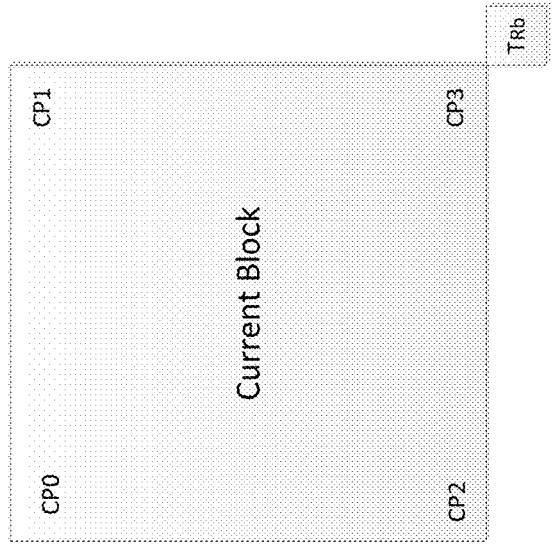
FIGS. 14A and 14B shows candidate positions for the complex merge mode.
Figure 14A:
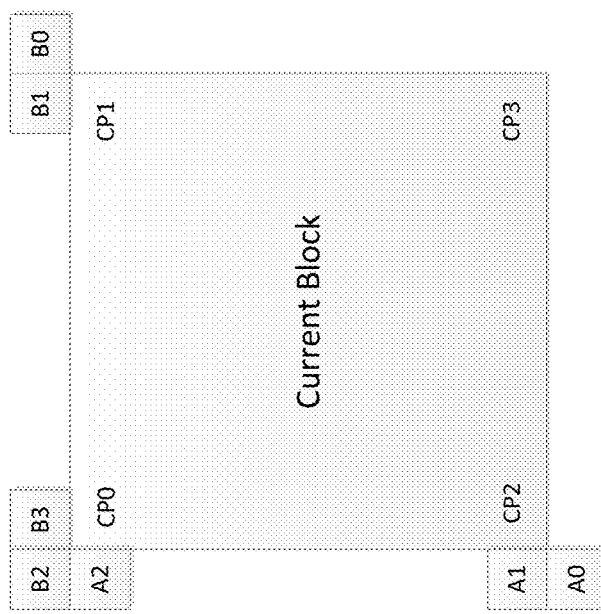

FIGS. 14A and 14B shows candidate positions for the complex merge mode. FIG. 14A shows the positions for spatial candidates for the complex merge mode, and FIG. 14B shows a position for a temporal candidate for the complex merge mode.

In the complex merge mode, the control points are needed to determine the motion models. In a first step of the complex merge mode, the candidates of the control points are determined. The candidates of predicting the control points are shown in FIGS. 14A and 14B. $CP_k$ denotes the kth control point. For example, control points CP0, CP1, CP2 and CP3 are located at corners of the current block. In the FIGS. 14A-14B example, CP0 is the control point located at the top-left corner of the current block, CP1 is the control point located at the top-right corner of the current block, CP2 is the control point located at the bottom-left corner of the current block, and CP3 is the control point located at the bottom-right corner of the current block. FIG. 14A shows the spatial candidates for predicting the motion information of CP0, CP1, and CP2. FIG. 14B shows the position of the temporal candidate for predicting the motion information of CP3. Specifically, the spatial candidates for predicting the motion information of CP0 are shown as $B_2$, $A_2$, and $B_3$, the spatial candidates for predicting the motion information of CP1 are shown as $B_0$ and $B_1$, and the spatial candidates for predicting the motion information of CP2 are shown as $A_0$ and $A_1$. The temporal candidate for predicting the motion information of CP3 is shown as $T_{Rb}$.

In some examples, a control point has multiple candidates, and the motion information of the control point is determined from the candidates according to a priority order. For example, for CP0, the priority order for checking is $B_2$, $A_2$, then $B_3$; for CP1, the priority order for checking is $B_0$ then $B_1$; for CP2, the priority order for checking is $A_0$ then $A_1$; for CP3, $T_{Rb}$ is used.

The control points are then used to construct the candidate model list. Various models can be constructed based on subsets of the control points, such as CP0, CP1, CP2 and CP3. For example, 11 models can be constructed. A first model is an affine model that is constructed using two control points (CP1, CP2); a second model is an affine model that is constructed using two control points (CP0, CP2); a third model is an affine model that is constructed using three control points (CP0, CP1, CP2); a fourth model is an affine model that is constructed using two control points (CP0, CP1); a fifth model is an affine model that is constructed using two control points (CP1, CP3); a sixth model is an affine model that is constructed using two control points (CP2, CP3); a seventh model is an affine model that is constructed using two control points (CP0, CP3); an eighth model is a bilinear model; a ninth model is an affine model that is constructed using three control points (CP0, CP1, CP3); a tenth model is an affine model that is constructed using three control points (CP1, CP2, CP3); an eleventh model is an affine model that is constructed using three control points (CP0, CP2, CP3).

A candidate model list is constructed according to an order, such as the order from the first model to the eleventh model. For example, when the motion information of the selected control points for a model can be derived and is not identical in at least one reference picture list (such as L0 or L1), the model can be put into the candidate model list as one of the candidate models. In an example, the encoder encodes an index in the coded video stream for a model in the candidate model list that is used at the encoder side for prediction in the complex merge mode. The index can be encoded as 3 binary bits using equal length binarization. At the decoder side, the decoder decodes a complex merge index from the 3 binary bits from the coded video bitstream. The decoder starts a process to construct the candidate model list. When a candidate index for a model to be put into the candidate model list is equal to the decoded complex merge index, the process stops, and the decoder determines that the model to be the same model used by the encoder.

It is noted that when multiple affine prediction candidates exist, either for merge mode or AMVP mode, the affine prediction candidates are ordered in the same manner at the encoder side and the decoder side. The encoder selects a candidate and signals an index of the selected candidate in the coded video bitstream. The decoder decodes the index from the coded video bitstream and selects the candidate according to the index.

Aspects of the disclosure provide techniques to reduce the storage requirement of motion data to be stored in a line buffer (also referred to as motion data line buffer) for deriving affine merge candidates or affine MVP candidates when the neighboring blocks above the current block is outside of current largest coding unit, e.g. Coding Tree Unit (CTU). More specifically, instead of storing motion vectors of all the control points and block width and/or height values, in some embodiments, motion vectors of the minimum-size blocks (e.g., smallest units for compensation) that are just above the current CTU line (e.g., adjacent from the top to the CTU line) are stored in the line buffer. When a control point is at a position other than just above the current CTU line, then the motion vector of the control point is not stored in the line buffer, also the block width and/or height of the neighboring blocks that are just above the CTU line are not stored in the line buffer.

According to an aspect of the disclosure, motion vector information of the control points can be derived from regular motion information in the line buffer. Generally, the line buffer stores the regular motion information of the minimum-size blocks just above the CTU line, and the regular motion information of the minimum-size blocks are used for regular merge/skip/AMVP modes. In the affine merge mode, when the current block is at the top CTU boundary, the motion information of the two control points at the top of current block may be derived from neighboring blocks' regular motion information (that is already stored in the line buffer) when the neighboring candidate blocks are above the current CTU boundary. Thus, the affine merge mode shares the regular motion information of the minimum-size blocks with the regular merge/skip/AMVP mode, and the regular motion information has been already stored for the regular merge/skip/AMVP mode. In an example, the regular motion information of the minimum-size blocks includes motion vectors respectively for the minimum-size blocks. For example, a representative location is selected for each minimum-size block, and the motion vector at the representative location is used as the motion vector for the minimum-size block. Thus, no additional motion information, other than the regular motion information, needs to be stored in the line buffer for the affine merge mode. In some examples, the affine control point information or affine flag may not be necessary to be saved in line buffer.

It is noted that when the current block is not at the top CTU boundary, other suitable derivation techniques, such as the model based affine merge, multiple control points based affine merge, and the like can be used to derive the affine model parameters for affine merge mode.

Figure 15:
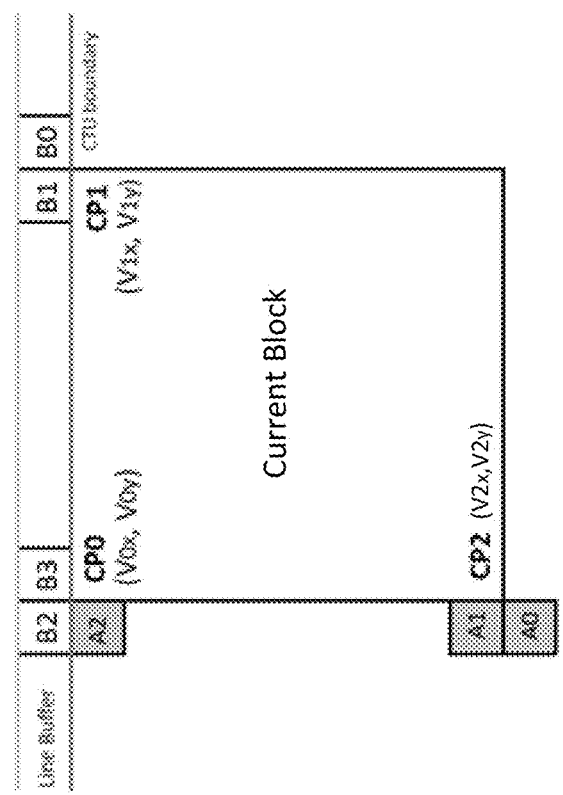
FIG. 15 shows a diagram for deriving control point motion information from regular motion information according to an embodiment of the disclosure.

FIG. 15 shows a diagram for deriving control point motion information from regular motion information according to an embodiment of the disclosure. As shown in FIG. 15, the current block is at a CTU boundary. Three corners of the current block are selected as control points CP0, CP1 and CP2. CP0 is the control point located at the top-left corner of the current block, CP1 is the control point located at the top-right corner of the current block, and CP2 is the control point located at the bottom-left corner of the current block. CP0 and CP1 are the control points at the top corners of the current block. In an example, the control point CP0 has 3 candidate blocks, A2, B2, and B3 as shown in FIG. 15; the control point CP1 has 2 candidate blocks, B0 and B1 as shown in FIG. 15.

In the FIG. 15 example, the line buffer stores the regular motion information of the minimum-size blocks that are above the CTU boundary. For example, the line buffer buffers the motion vectors of B2, B3, B1 and B0.

In an embodiment, neighboring candidate blocks that are on the left of the current block and are below the CTU top boundary (referred to as left neighboring candidate blocks), such as the A0, A1 and A2 in the FIG. 15 example, are checked. When a specific left neighboring candidate block is available and affine coded, the affine parameters and motion vectors of the control points of the current block can be derived from the affine model of the specific left neighboring candidate block, such as using techniques of the model based affine merge. Various checking order can be used to check the left neighboring candidate blocks, and the first left neighboring candidate block that is affine coded can be used as merge candidate for the current block. The checking order can be any one of {A0, A1, A2}, {A0, A2, A1}, {A1, A0, A2}, (A1, A2, A0), {A2, A0, A1}, or {A2, A1, A0}.

When none of A0, A1, or A2 is available or affine coded, the control points of the current block at the top CTU boundary may be derived using the regular motion information of the neighboring blocks.

In an embodiment, as depicted in FIG. 15, the control point CP0 has three neighboring candidate blocks A2, B2, and B3. Various checking order can be used to check the neighboring candidate blocks, and the first neighboring candidate block that is affine coded can be used as merge candidate. For example, the motion information (or a scaled version of the motion information) of the first neighboring candidate block that is affine coded is copied to CP0. The checking order can be any one of {A2, B2, B3}, {A2, B3, B2}, {B2, A2, B3}, {B2, B3, A2}, {B3, A2, B2}, or {B3, B2, A2}.

Similarly, the control point CP1 has two neighboring candidate block B0 and B1. Various checking order can be used to check the neighboring candidate blocks, and the first neighboring candidate block that is affine coded can be used as merge candidate. For example, the motion information (or a scaled version of the motion information) of the first neighboring candidate block that is affine coded is copied to CP1. The checking order can be any one of {B0, B1} or {B1, B0}.

In another embodiment, as depicted in FIG. 15, the control point CP0 has two neighboring candidate blocks B2, and B3 in the line buffer. Various checking order can be used to check the neighboring candidate blocks, and the first neighboring candidate block that is affine coded can be used as merge candidate. For example, the motion information (or a scaled version of the motion information) of the first neighboring candidate block that is affine coded is copied to CP0. The checking order can be any one of {B2, B3} or {B3, B2}.

Similarly, the control point CP1 has two neighboring candidate block B0 and B1. Various checking order can be used to check the neighboring candidate blocks, and the first neighboring candidate block that is affine coded can be used as merge candidate. For example, the motion information (or a scaled version of the motion information) of the first neighboring candidate block that is affine coded is copied to CP1. The checking order can be any one of {B0, B1} or {B1, B0}.

In another embodiment, all the combinations of CP0 using motion information from any of {A2, B2, B3} and CP1 using motion information from any of {B0, B1} may be used to derive the current block's affine model. It is noted that redundant combinations when some or all of the neighboring blocks for CP0 or CP1 have the same motion information can be pruned. All the combinations of CP0 and CP1 motion information pair may form a candidate list after the aforementioned redundancy pruning. Then, one of the candidates in the candidate list is selected and the index of the selected candidate is coded into the coded video bitstream by the encoder. At the decoder side, the decoder can form the candidate list in the same manner as the encoder and decodes the index of the selected candidate from the coded video bitstream.

According to another aspect of the disclosure, candidates of the model based affine merge can be derived from the regular motion information in the line buffer. Similarly, the line buffer stores the regular motion information of the minimum-size blocks just above the CTU line, and the regular motion information of the minimum-size blocks are used for regular merge/skip/AMVP modes. In the affine merge mode, when the current block is at the top CTU boundary, the affine model, such as 4-parameter affine model, of current block may be derived from neighboring blocks' regular motion information (that is already stored in the line buffer) when the neighboring candidate blocks are above the current CTU boundary. Thus, the affine merge mode shares the regular motion information of the minimum-size blocks with the regular merge/skip/AMVP mode, and the regular motion information has been already stored for the regular merge/skip/AMVP mode. In an example, the regular motion information of the minimum-size blocks includes motion vectors respectively for the minimum-size blocks. For example, a representative location is selected for each minimum-size block, and the motion vector at the representative location is used as the motion vector for the minimum-size block. Thus, no additional motion information, other than the regular motion information, needs to be stored in the line buffer for the affine merge mode. In some examples, the affine control point information or affine flag may not be necessary to be saved in the line buffer. In an example, the affine control point information and the affine flag are not stored in the line buffer. In another example, the affine control point information and/or the affine flag are stored in the line buffer.

It is noted that when the current block is not at the top CTU boundary, other suitable derivation techniques, such as the model based affine merge, multiple control points based affine merge, and the like can be used to derive the affine model parameters for affine merge mode.

Figure 16:
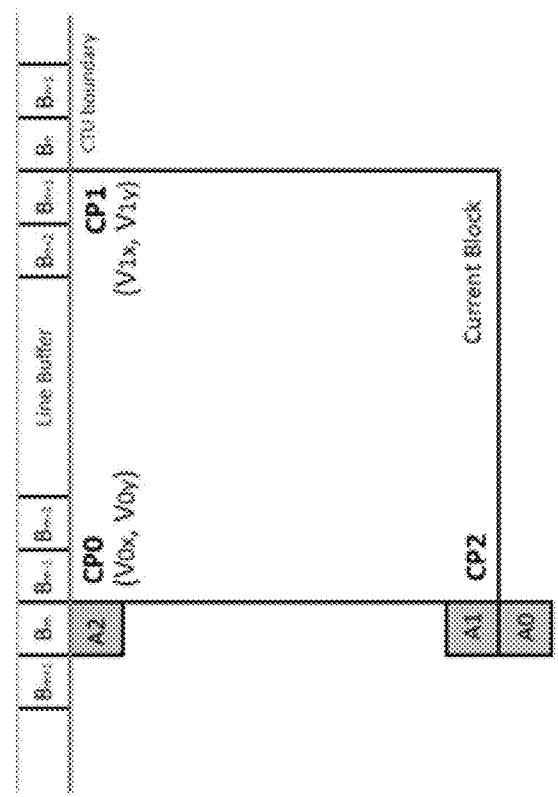
FIG. 16 shows a diagram for illustrating a model based affine merge candidate derivation with reduced line buffer according to an embodiment of the disclosure.

FIG. 16 shows a diagram for illustrating a model based affine merge candidate derivation with reduced line buffer according to an embodiment of the disclosure.

In the FIG. 16 example, the current block is at the top of CTU boundary, all the above neighboring blocks (minimum-size blocks) are stored in the line buffer (also referred to as motion date line buffer). Three corners of the current block are selected as control points CP0, CP1 and CP2. CP0 is the control point located at the top-left corner of the current block, CP1 is the control point located at the top-right corner of the current block, and CP2 is the control point located at the bottom-left corner of the current block. CP0 and CP1 are the control points at the top corners of the current block.

In the FIG. 16 example, $B_m$ denotes the top-left neighboring block, $B_{m-1}$ denotes the immediate neighbor on the right of $B_m$, and $B_{m+1}$ denotes the immediate neighbor on the left of $B_m$; $B_n$ denote the top-right neighboring block, $B_{n-1}$ denotes the immediate neighbor on the right of $B_n$ and $B_{n+1}$ denotes the immediate neighbor on the left of B.

In an example, the control point CP0 has 3 candidate blocks, A2, $B_m$, and $B_{m+1}$ as shown in FIG. 16; the control point CP1 has 2 candidate blocks, $B_n$ and $B_{n+1}$ as shown in FIG. 16.

In the FIG. 16 example, the line buffer stores the regular motion information of the minimum-size blocks that are above the CTU boundary. For example, the line buffer buffers the motion vectors of $B_{m+1}, B_m, B_{m-1}, B_{m-2}, \ldots, B_{n+2}, B_{n+1}, B_n, B_{n-1}, \ldots$, and the like.

In an embodiment, neighboring candidate blocks that are on the left of the current block and are below the CTU top boundary (referred to as left neighboring candidate blocks), such as the A0, A1 and A2 in the FIG. 16 example, are checked. When a specific left neighboring candidate block is available and affine coded, the affine parameters and motion vectors of the control points of the current block can be derived from the affine model of the specific left neighboring candidate block, such as using techniques of the model based affine merge. Various checking order can be used to check the left neighboring candidate blocks, and the first left neighboring candidate block that is affine coded can be used as merge candidate for the current block. The checking order can be any one of {A0, A1, A2}, {A0, A2, A1}, {A1, A0, A2}, (A1, A2, A0), {A2, A0, A1}, or {A2, A1, A0}.

When none of A0, A1, or A2 is available or affine coded, the affine model and motion vectors of the control points of the current block at the top CTU boundary may be derived using the regular motion information of the above neighboring blocks in the line buffer.

To describe the two control points of the current block, (V0x, V0y) denote the motion vector of CP0, (V1x, V1y) denote the motion vector of CP1. In an embodiment, a pair of adjacent neighboring blocks in the line buffer may be used in an affine model derivation.

In an example, (Eq. 1) is simplified. For example, a denotes ρ cos θ, and b denotes ρ sin θ. (Eq. 1) is simplified to (Eq. 4). In an example, the relationship of a and b to two motion vectors $(MV_0^h, MV_0^v)$, and $(MV_1^h, MV_1^v)$ are shown in (Eq. 5)-(Eq. 8).

$$\begin{cases} x' = ax + by + c \\ y' = -bx + ay + f \end{cases} \quad \text{(Eq. 4)}$$

$$a = \frac{MV_1^h - MV_0^h}{W} \quad \text{(Eq. 5)}$$

$$b = -\frac{MV_1^v - MV_0^v}{W} \quad \text{(Eq. 6)}$$

$$c = MV_0^h \quad \text{(Eq. 7)}$$

$$f = MV_0^v \quad \text{(Eq. 8)}$$

As shown in FIG. 16, regular motion information (e.g., motion vectors) of the above neighboring blocks are stored in the line buffer. In order to derive 4-parameter affine model, at least 2 candidate blocks are needed.

In an embodiment, 4 pairs of consecutive candidate blocks may be checked according to a checking order. Then, during the checking, the first pair that is available to derive affine model is used as merge candidate. The four pairs of candidates are: a first pair P0 of $B_{m+1}$ and $B_m$, a second pair P1 of $B_{m-1}$ and $B_{m-2}$, a third pair P2 of $B_{n+2}$ and $B_{n+1}$, a fourth pair P3 of $B_n$, $B_{n-1}$. The order of availability checking may be any order with P0, P1, P2, P3, such as {P0, P1, P2, P3}, {P0, P1, P3, P2}, {P3, P2, P1, P0}, {P3, P1, P2, P0}, etc.

In another embodiment, according to the merge candidate list construction, when one of the above neighboring positions is accessed for deriving model based affine parameters, and the neighbors are above of current CTU top boundary, then the pair of consecutive candidate blocks mentioned in the above embodiment that is located in the said neighboring position can be used to derive the affine model parameters of the neighboring block, and can be used to derive control points' motion information of the current block.

In the embodiment, D denotes the distance between each consecutive pair of candidates, and is the size or width of minimum-size blocks with motion information. In an example, D is four. Further, C0 and C1 denote a pair of consecutive neighboring blocks that are used for the derivation process. The motion vectors for C0 and C1 are denoted as ($V_{C0x}$, $V_{C0y}$) for C0, and ($V_{C1x}$, $V_{C1y}$) for C1. C0 is positioned at ($x_{C0}$, $y_{C0}$), and C1 is positioned at ($x_{C1}$, $y_{C1}$). Further, ($x_0$, $y_0$) denotes the position of the control point CP0; and ($x_1$, $y_1$) denotes the position of the control point CP1 in the FIG. 16 example. Then, the motion vectors for the control points CP0 and CP1 can be derived according to (Eq. 9) and (Eq. 10):

$$\begin{cases} v_{0x} = \frac{(v_{C1x} - v_{C0x})(x_0 - x_{C0}) - (v_{C1y} - v_{C0y})(y_0 - y_{C0})}{D} + v_{C0x} \\ v_{0y} = \frac{(v_{C1y} - v_{C0y})(x_0 - x_{C0}) + (v_{C1x} - v_{C0x})(y_0 - y_{C0})}{D} + v_{C0y} \end{cases} \quad \text{(Eq. 9)}$$

$$\begin{cases} v_{1x} = \frac{(v_{C1x} - v_{C0x})(x_1 - x_{C0}) - (v_{C1y} - v_{C0y})(y_1 - y_{C0})}{D} + v_{C0x} \\ v_{1y} = \frac{(v_{C1y} - v_{C0y})(x_1 - x_{C0}) + (v_{C1x} - v_{C0x})(y_0 - y_{C0})}{D} + v_{C0y} \end{cases} \quad \text{(Eq. 10)}$$

In an example, for each pair of candidates, when the pair of candidates have identical motion vectors, that indicates that the pair of candidates are coded with regular translational motion vectors, and are not coded in affine mode. Such pair of candidates will be skipped.

In another embodiment, 4 pairs of consecutive neighboring blocks are checked. The four pairs of candidates are: P0{$B_{m+1}$, $B_m$}, P1{$B_{m-1}$, $B_{m-2}$}, P2{$B_{n+2}$, $B_{n+1}$}, P3{$B_n$, $B_{n-1}$}. All available pairs of candidate blocks will be used to derive a pair of control point's motion vector values for the current block.

For example, for each available pair of candidate blocks, (Eq. 9) and (Eq. 10) are used to derive motion vectors of the control points CP0 and CP1. In an embodiment, each available pair of derived CP0 and CP1 values can be used as an affine merge candidate to form a candidate list of derived CP0 and CP1. In another embodiment, only the spatial merge candidate locations in the above neighbors will be checked. If a block in one of those locations is coded in affine mode, affine parameters can be derived from this block. For example, when deriving from the regular motion information stored in motion data line buffer, the corresponding coding blocks at the spatial merge candidate locations (as B0, B1, B2 in FIG. 8 and FIG. 12) are checked. When the corresponding block is affine coded, the current block's affine model and control points motion information can be derived from the neighboring coding block, using the regular motion information at the 2 bottom corners as an approximation of the bottom control point motion information.

It is noted that when the current block is not at the top CTU boundary, the regular derivation methods for affine merge candidate, such as model based affine merge, multiple control points based affine merge, and the like can be used.

According to another aspect of the disclosure, affine merge is skipped for blocks at the top of a CTU, such as at the top boundary of the CTU, to avoid extra motion data storage for line buffer, reduce line buffer size and save cost.

In some embodiments, when the current block is at the top CTU boundary, the affine merge mode may be disabled when left neighboring affine merge candidates is not available. For example, when the current block is at the top CTU boundary and the blocks A0, A1 and A2 are not available or not affine coded, the affine merge mode is disabled. Thus, there is no need to put affine motion information of the neighboring blocks above the CTU boundary into the line buffer.

In an embodiment, the affine merge candidate is derived from the first available neighboring block, such as the model based affine merge. When the left neighboring blocks A0, A1 and A2 of the current block are not available or not affine coded, and when the current block is at the top CTU boundary (for example in FIG. 16), the affine merge is disabled for current block.

In another embodiment, the affine merge candidate is combined with other regular inter merge candidates on a unified merge candidate list. When the current block is at the CTU top boundary (for example in FIG. 16), and the left neighboring blocks A0, A1 and A2 of the current block are not available or not affine coded, affine merge candidate will not be added to the unified merge candidate list.

According to an aspect of the disclosure, an affine flag is stored for each affine coded block in the line buffer. In an example, the minimum allowed affine block is M×N (M is the width, and N is the height of minimum allowed affine block), and the width of the minimum-size block is D, then for each M/D consecutive minimum-size blocks horizontally, a 1-bit affine flag is stored to indicate whether a block is affine coded or not.

In an embodiment, when a block is at the bottom of a CTU, at the time to store the motion data information of the block into the line buffer for future CTU row usage, the affine flag for each M/D consecutive minimum-size blocks is also stored in the line buffer.

For a current block that is on top of the CTU (just blow a CTU boundary that separate a previous CTU row with a current CTU row), the above neighbors are above the current CTU row and are in the previous CTU row. When the line buffer stores affine flag information, the affine flag information can be used to, for example, determine whether to derive model based affine merge candidate with regular motion information in the line buffer. For example, when the affine flag information indicates that one of the above neighbors who is above the current CTU is not coded in affine mode, the pair of minimum-size blocks in that location cannot be used to derive affine model.

It is noted that while control point motion vector derivation from neighboring blocks is used in the above description, other suitable methods can be used in the similar manner.

Figure 17:
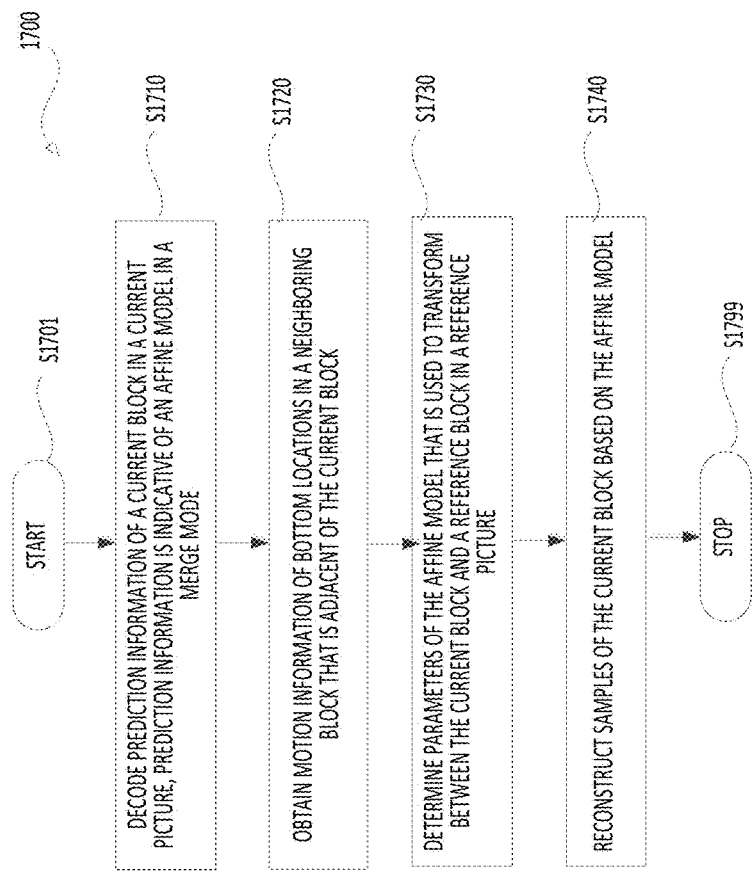
FIG. 17 shows a flow chart outlining a process according to an embodiment of the disclosure.

FIG. 17 shows a flow chart outlining a process (1700) according to an embodiment of the disclosure. The process (1700) can be used in the reconstruction of a block coded in intra mode, so to generate a prediction block for the block under reconstruction. In various embodiments, the process (1700) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1700) is implemented in software instructions, thus when the processing circuitry executes the software instructions, the processing circuitry performs the process (1700). The process starts at (S1701) and proceeds to (S1710).

At (S1710), prediction information of a current block is decoded from a coded video bitstream. The prediction information is indicative of an affine model in a merge mode.

At (S1720), motion information of bottom locations, such as regular motion information of bottom locations, of a neighboring block that is adjacent to the current block is obtained. In an example, the neighboring block is in a different CTU row from the current block, such as a CTU row above the current block. The motion information of the neighboring block is stored in a line buffer. When motion information of non-bottom locations (e.g., control points of top corners of the neighboring block) is not needed for determining the affine model, the line buffer does not need to store the motion information of non-bottom locations. Then, the size of the line buffer can be reduced to save cost.

At (S1730), parameters of the affine model are determined based on the motion information of the bottom locations in the neighboring block. For example, the motion vectors of the control points of the current block can be derived from the regular motion vectors of the bottom locations of the neighboring block.

At (S1740), samples of the block are reconstructed according to the affine model. In an example, a reference pixel in the reference picture that corresponds to a pixel in the block is determined according to the affine model. Further, the pixel in the block is reconstructed according to the reference pixel in the reference picture. Then, the process proceeds to (S1799) and terminates.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.minimum-size block The instructions can be executed on various types of computers or components thereof, including, for example, personal computers, tablet computers, servers, smartphones, gaming devices, internet of things devices, and the like.

Figure 18:
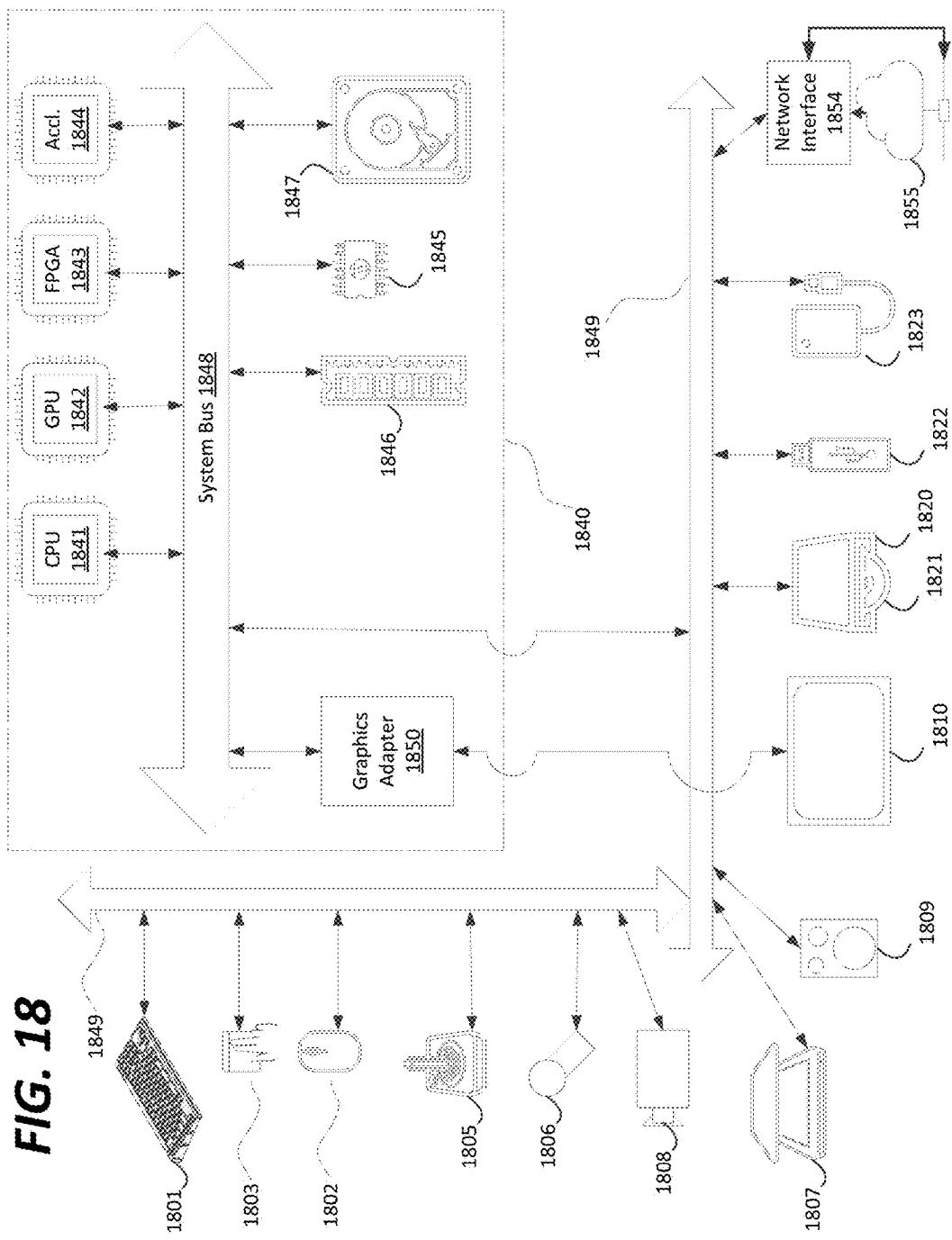
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video decoding in a decoder, comprising:
decoding prediction information of a current block in a first coding tree unit (CTU) of a current picture from a coded video bitstream, the prediction information being indicative of an affine model in a merge mode;
obtaining, from a line buffer that buffers motion vectors of minimum-size blocks at bottom locations in a CTU row of a second CTU above the current block, motion vectors of specific minimum-size blocks;
determining parameters of the affine model that is used to transform between the block and a reference block in a reference picture that has been reconstructed based on the motion vectors of the specific minimum-size blocks in the line buffer; and
reconstructing at least a sample of the current block based on the affine model,
wherein the line buffer is configured not to buffer motion vectors of non-bottom minimum-size blocks in the CTU row above the current block.

2. The method of claim 1, wherein the line buffer is configured not to buffer motion vectors of control points of affine coded blocks.

3. The method of claim 1, further comprising:
deriving motion vectors of control points of the current block based on the motion vectors of the specific minimum-size blocks using a four-parameter affine model.

4. The method of claim 3, further comprising:
detecting, based on an affine flag, whether a minimum-size block neighboring to a control point is affine coded, the affine flag indicating whether a plurality of consecutive minimum-size blocks belong to an affine coded block; and
deriving a motion vector of the control point based on the motion vector of the minimum-size block when the minimum-size block is affine coded.

5. The method of claim 4, further comprising:
using the motion vector of the minimum-size block as the motion vector of the control point when the minimum-size block neighboring to the control point is affine coded.

6. The method of claim 1, further comprising:
determining a pair of minimum-size blocks that are affine coded; and
determining parameters of a four-parameter affine model based on motion vectors of the pair of minimum-size blocks.

7. The method of claim 6, further comprising:
determining a pair of consecutive minimum-size blocks that are affine coded; and
determining the parameters of the four-parameter affine model based on motion vectors of the pair of consecutive minimum-size blocks.

8. The method of claim 1, further comprising:
determining a pair of minimum-size blocks that are affine coded; and
determining motion vectors of control points at two top corners of the current block based on motion vectors of the pair of minimum-size blocks.

9. The method of claim 1, further comprising:
disabling an affine merge mode when none of left neighboring blocks of the current block are available as an affine coded block.

10. An apparatus for video decoding, comprising:
processing circuitry configured to:
decode prediction information of a current block in a first coding tree unit (CTU) of a current picture from a coded video bitstream, the prediction information being indicative of an affine model in a merge mode;
obtain, from a line buffer that buffers motion vectors of minimum-size blocks at bottom locations in a CTU row of a second CTU above the current block, motion vectors of specific minimum-size blocks;
determine parameters of the affine model that is used to transform between the block and a reference block in a reference picture that has been reconstructed based on the motion vectors of the specific minimum-size blocks in the line buffer; and
reconstruct at least a sample of the current block based on the affine model,
wherein the line buffer is configured not to buffer motion vectors of non-bottom minimum-size blocks in the CTU row above the current block.

11. The apparatus of claim 10, wherein the line buffer is configured not to buffer motion vectors of control points of affine coded blocks.

12. The apparatus of claim 10, wherein the processing circuitry is further configured to:
derive motion vectors of control points of the current block based on the motion vectors of the specific minimum-size blocks using a four-parameter affine model.

13. The apparatus of claim 12, wherein the processing circuitry is further configured to:
detect, based on an affine flag, whether a minimum-size block neighboring to a control point is affine coded, the affine flag indicating whether a plurality of consecutive minimum-size blocks belong to an affine coded block; and
derive a motion vector of the control point based on the motion vector of the minimum-size block when the minimum-size block is affine coded.

14. The apparatus of claim 10, wherein the processing circuitry is further configured to:
determine a pair of minimum-size blocks that are affine coded; and
determine parameters of a four-parameter affine model based on motion vectors of the pair of minimum-size blocks.

15. The apparatus of claim 10, wherein the processing circuitry is further configured to:

determine a pair of minimum-size blocks that are affine coded; and determine motion vectors of control points at two top corners of the current block based on motion vectors of the pair of minimum-size blocks.

16. A non-transitory computer-readable medium storing instructions which when executed by a computer for video decoding cause the computer to perform:

decoding prediction information of a current block in a first coding tree unit (CTU) of a current picture from a coded video bitstream, the prediction information being indicative of an affine model in a merge mode;

obtaining, from a line buffer that buffers motion vectors of minimum-size blocks at bottom locations in a CTU row of a second CTU above the current block, motion vectors of specific minimum-size blocks;

determining parameters of the affine model that is used to transform between the block and a reference block in a reference picture that has been reconstructed based on the motion vectors of the specific minimum-size blocks in the line buffer; and reconstructing at least a sample of the current block based on the affine model, wherein the line buffer is configured not to buffer motion vectors of non-bottom minimum-size blocks in the CTU row above the current block.

* * * * *